US008253444B2

(12) United States Patent
Hayashi et al.

(10) Patent No.: US 8,253,444 B2
(45) Date of Patent: Aug. 28, 2012

(54) RECEIVING CIRCUIT

(75) Inventors: Tetsuya Hayashi, Kawasaki (JP); Daisuke Suzuki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 220 days.

(21) Appl. No.: 12/696,335

(22) Filed: Jan. 29, 2010

(65) Prior Publication Data
US 2010/0237906 A1  Sep. 23, 2010

(51) Int. Cl.
*H03K 5/22* (2006.01)
(52) U.S. Cl. .......................................... 327/65; 327/563
(58) Field of Classification Search ................ 327/65, 327/77, 560–563
See application file for complete search history.

(56) References Cited

U.S. PATENT DOCUMENTS

| 5,369,313 | A | 11/1994 | Yoshihara | |
|---|---|---|---|---|
| 6,590,429 | B2 * | 7/2003 | Choi et al. | 327/74 |
| 6,867,623 | B2 * | 3/2005 | Nishizono | 327/78 |
| 7,339,421 | B2 * | 3/2008 | Okamura | 327/563 |
| 7,525,348 | B1 * | 4/2009 | Ziazadeh | 327/65 |
| 7,868,664 | B2 * | 1/2011 | Markozen et al. | 327/65 |
| 7,880,510 | B2 * | 2/2011 | Do | 327/63 |

FOREIGN PATENT DOCUMENTS

| JP | 5-67933 A | 3/1993 |
|---|---|---|
| JP | 2001-251164 A | 9/2001 |

* cited by examiner

*Primary Examiner* — Hai L Nguyen
(74) *Attorney, Agent, or Firm* — Arent Fox LLP

(57) ABSTRACT

A receiving circuit includes an impedance compensating circuit, a first input terminal and a second input terminal coupled to a first signal line and a second signal line, a first signal and a second signal corresponding to differential signals being transmitted at the first input terminal and the second input terminal, respectively, a signal input circuit, coupled to the first input terminal and the second input terminal, which receives the first signal and the second signal are input, and a differential-signal detector that detects whether or not the differential signals are supplied to the first input terminal and the second input terminal.

16 Claims, 11 Drawing Sheets

FIG. 2
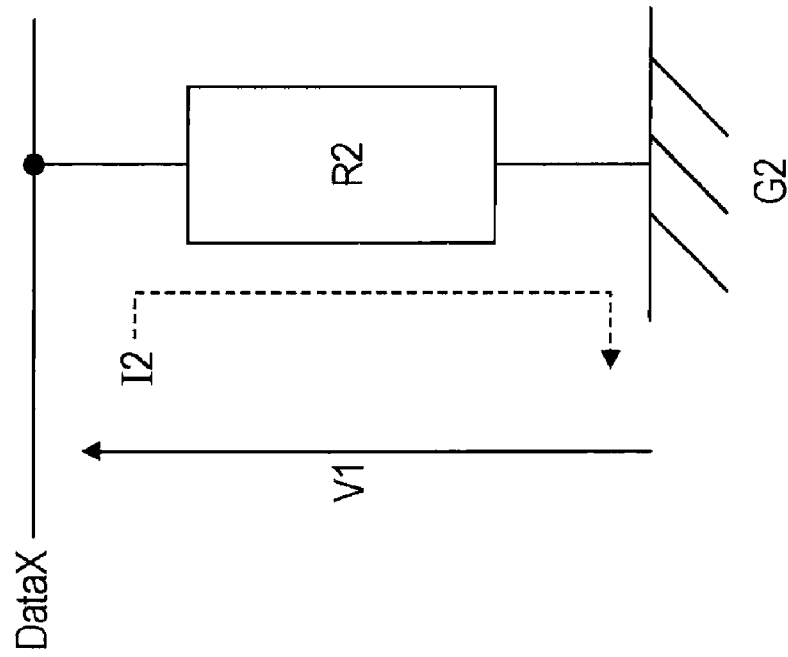
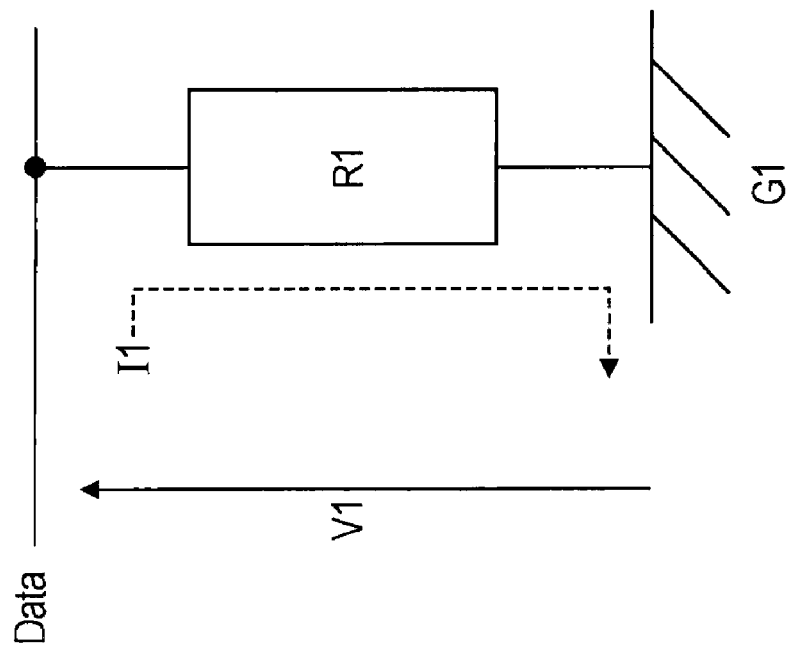

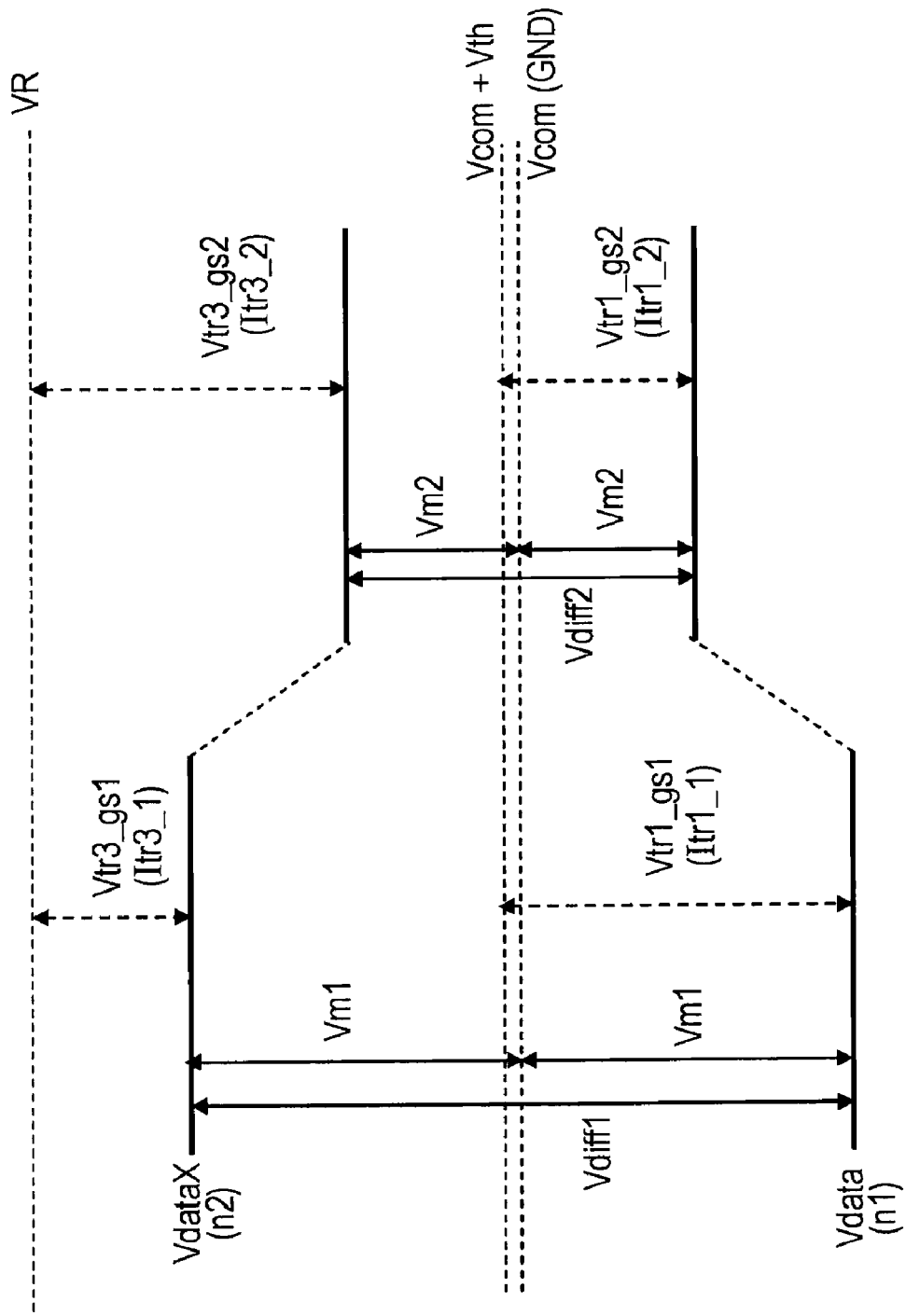

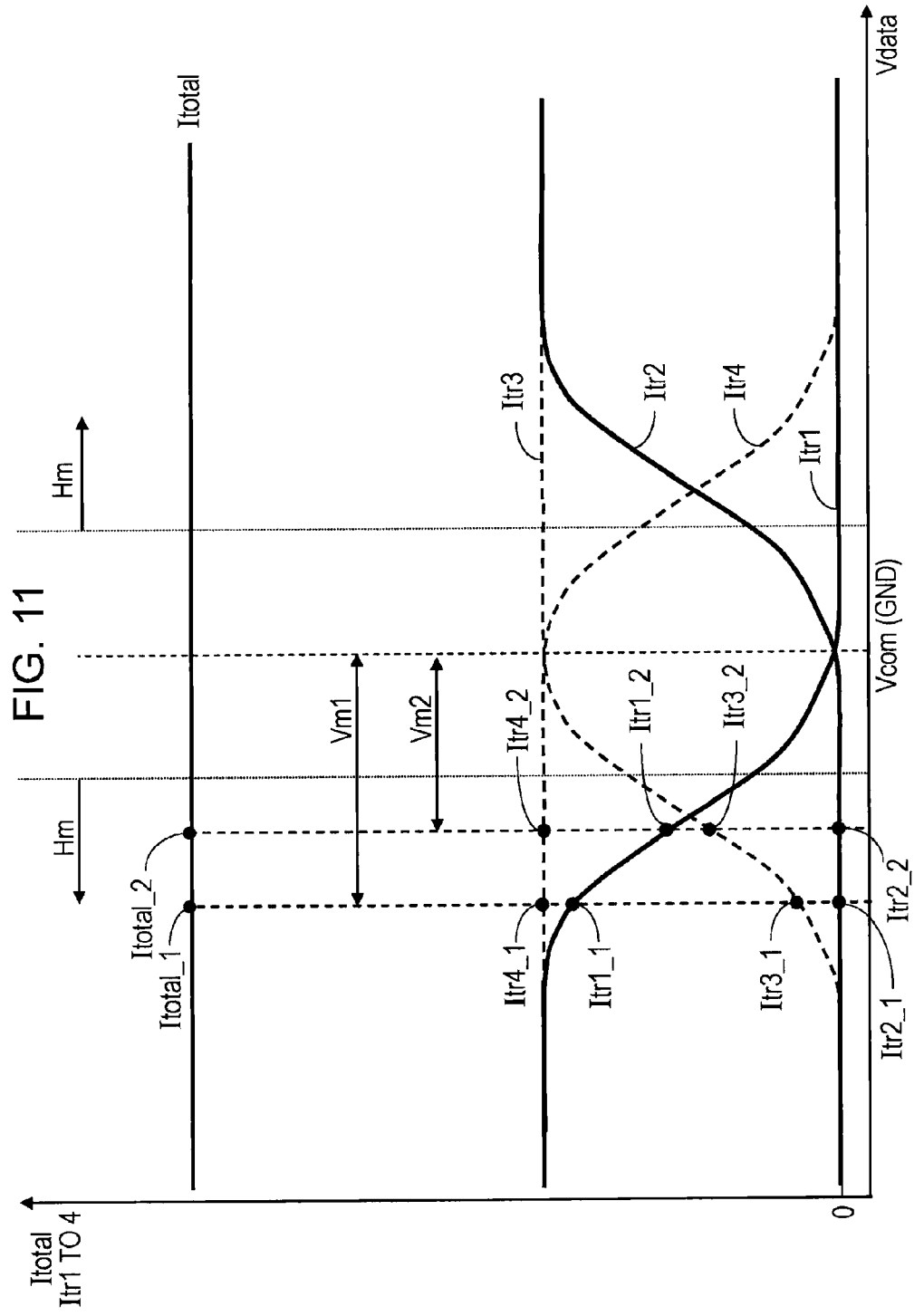

RECEIVING CIRCUIT

CROSS-REFERENCE TO RELATED APPLICATIONS

This application claims the benefit of priority from Japanese Patent Application No. 2009-69805 filed on Mar. 23, 2009, the entire contents of which are incorporated herein by reference.

BACKGROUND

1. Field

The embodiments discussed herein relate to a receiving circuit.

2. Description of Related Art

In differential transmission systems for high-speed transmission, signal lines at receiving ends are terminated in order to prevent reflection.

Such receiving circuits are disclosed in, for example, Japanese Laid-open Patent Publication Nos. H5-67933 and 2001-251164.

SUMMARY

According to one aspect of the embodiments, a receiving circuit is provided which includes: an impedance compensating circuit; a first input terminal and a second input terminal coupled to a first signal line and a second signal line which are terminated respectively, a first signal and a second signal corresponding to differential signals being transmitted at the first input terminal and the second input terminal respectively; a signal input circuit, coupled to the first input terminal and the second input terminal, which receives the first signal and the second signal as input; and a differential-signal detector that detects whether or not the differential signals are supplied to the first input terminal and the second input terminal. The differential-signal detector causes a first current to flow to the first input terminal when a potential of the second signal is higher than a potential of the first signal and the first signal and the second signal have a first potential difference. The differential-signal detector causes a second current to flow to the first input terminal when the potential of the second signal is higher than the potential of the first signal and the first signal and the second signal have a second potential difference. The differential-signal detector causes a third current to flow to the first input terminal when the potential of the second potential is higher than the potential of the first signal and the first signal and the second signal have the first potential difference. The differential-signal detector causes a fourth current to flow to the first input terminal when the potential of the second potential is higher than the potential of the first signal and the first signal and the second signal have a second potential difference.

Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIG. 2 illustrates an exemplary measurement of impedance values in a single-ended standard;

FIG. 10 illustrates an exemplary operation of an impedance compensating circuit; and FIG. 11 illustrates an exemplary a relationship between a differential signal and a current flowing to an input terminal.

DESCRIPTION OF EMBODIMENTS

Figure 1:
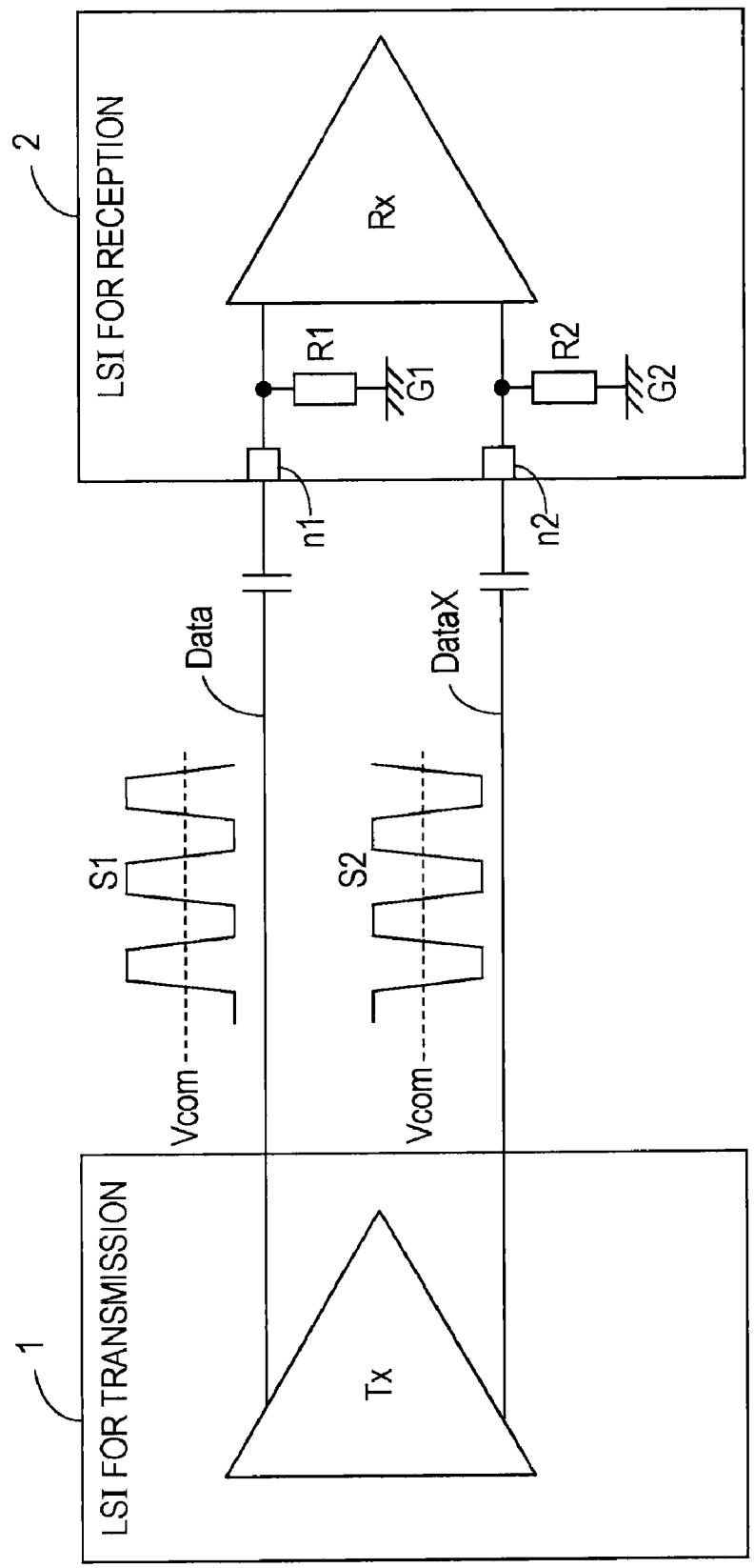
FIG. 1 illustrates an exemplary differential transmission system.

FIG. 1 illustrates an exemplary differential transmission system. A transmitting-end large-scale integrated circuit (LSI) 1 includes a transmitting circuit Tx. A receiving-end LSI 2 includes a receiving circuit Rx and termination resistors R1 and R2.

The transmitting circuit Tx transmits differential signals S1 and S2, which correspond to transmission data and have opposite phases with respect to each other, to the receiving circuit Rx through signal lines Data and DataX. During the transmission, common-node noise is added to the differential signals S1 and S2, so that a common potential Vcom of the differential signals S1 and S2 fluctuates, but the differential voltages of the differential signals S1 and S2 do not change. Thus, the receiving circuit Rx reproduces data from the received differential signals S1 and S2.

In PCI Express and Serial ATA, which are interfaces for personal computers, the impedance values of termination resistances for preventing reflection are standardized as follows.

For PCI Express, the impedance values in the single-ended standard are 40 to 60Ω and the impedance values in the differential standard are 80 to 120 Ω.

For Serial ATA, the impedance values in the single-ended standard are 40Ω or more and the impedance values in the differential standard are 85 to 115 Ω.

The single-ended standard is a standard for reflection of common-node noise and the differential standard is a standard for reflection of differential signals S1 and S2.

Termination resistors R1 and R2 may have an impedance of 50Ω, which is a characteristic impedance of the signal lines Data and DataX.

FIG. 2 illustrates an exemplary measurement of impedance values in the single-ended standard. The impedance values in the single-ended standard are measured based on currents I1 and I2 (indicated by dotted lines) flowing to the internal resistors R1 and R2 when a voltage V1 is applied between the signal line Data or DataX and ground. The impedance values may be V1/I1 and V1/I2, respectively.

Figure 3:
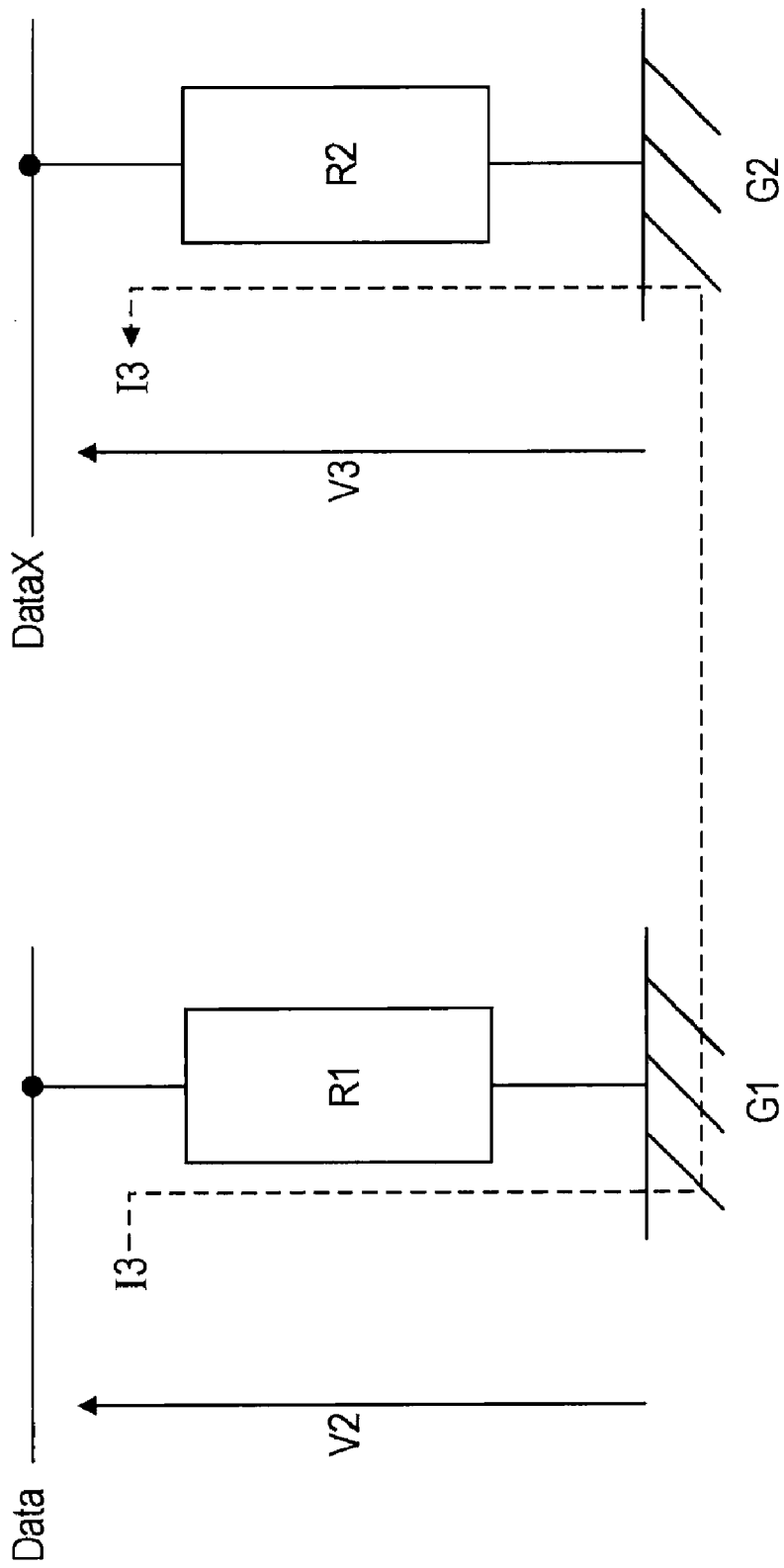
FIG. 3 illustrates an exemplary measurement of an impedance value in a differential standard.

FIG. 3 illustrates an exemplary measurement of an impedance value in the differential standard. The impedance value in the differential standard is measured based on a current I3 flowing thorough the internal resistors R1 and R2 during flow from the signal Data to the signal line DataX through grounds G1 and G2 when opposite-phase voltages V2 and V3 (V3=−V2) are applied to the signal lines Data and DataX. The impedance value may be a value expressed by (V2−V3)/I3.

When the receiving circuit Rx receives the differential signals S1 and S2, the internal circuit in the receiving circuit Rx may supply currents corresponding to the amplitudes of the differential signals S1 and S2 to the signal lines Data and DataX. Thus, the impedance value in the differential standard may fluctuate in response to the amplitudes of the differential signals S1 and S2, and may cause reflection.

Figure 4:
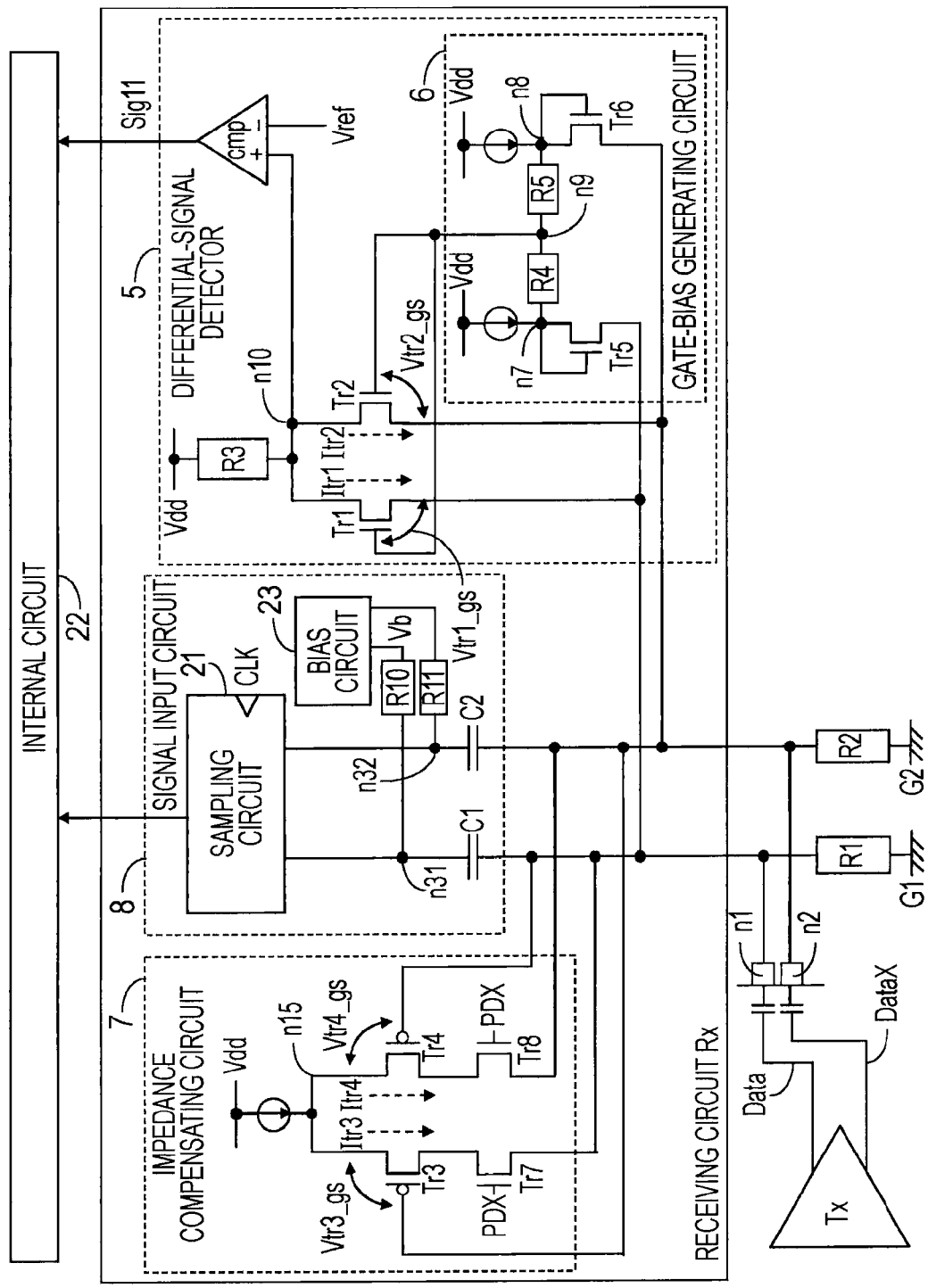
FIG. 4 illustrates a first embodiment.

FIG. 4 illustrates a first embodiment. FIG. 4 illustrates a transmitting circuit Tx, differential signal lines Data and DataX, first and second input terminals n1 and n2, termination resistors R1 and R2, and an internal circuit 22 of the LSI circuit for reception. The receiving circuit Rx includes a signal input circuit 8. The signal input circuit 8 samples differential signals input to the input terminals n1 and n2 and outputs the sampled differential signals to the internal circuit 22, in synchronization with a clock CLK.

The receiving circuit Rx further includes a differential-signal detector 5. The differential-signal detector 5 detects whether or not differential signals are supplied to the differential signal lines Data and DataX. In a normal operation, differential signals that change at a given frequency or higher are supplied to the signal lines Data and DataX in accordance with the above-described standard. Upon detecting that differential signals are supplied to the input terminals n1 and n2, the differential-signal detector 5 outputs a detection signal Sig11 to the internal circuit 22. When no differential signals are supplied to the input terminals n1 and n2, for example, when signals having substantially the same phase are supplied thereto, the internal circuit 22 enters a sleep state, for example, a power-saving state. When the differential-signal detector 5 detects differential signals, the internal circuit 22 changes from the sleep state to a normal operation state.

The differential-signal detector 5 causes currents Itr1 and Itr2, which depend on the amplitudes of the differential signals, to flow to the input terminals n1 and n2, so that the input impedance in the differential mode varies. Depending on the amplitudes of the differential signals, the input impedance in the differential mode may not match a standard value.

The signal input circuit 8 includes a bias circuit 23 and a sampling circuit 21. The differential signals S1 and S2 received at the input terminals n1 and n2 are input to the sampling circuit 21 via bypass capacitors C1 and C2, respectively. A bypass voltage Vb generated by the bias circuit 23 is applied to a pair of inputs n31 and n32 of the sampling circuit 21. The voltages of the differential input signals S1 and S2 having a common potential Vcom at ground are increased by an amount corresponding to the bias voltage Vb.

Figure 5:
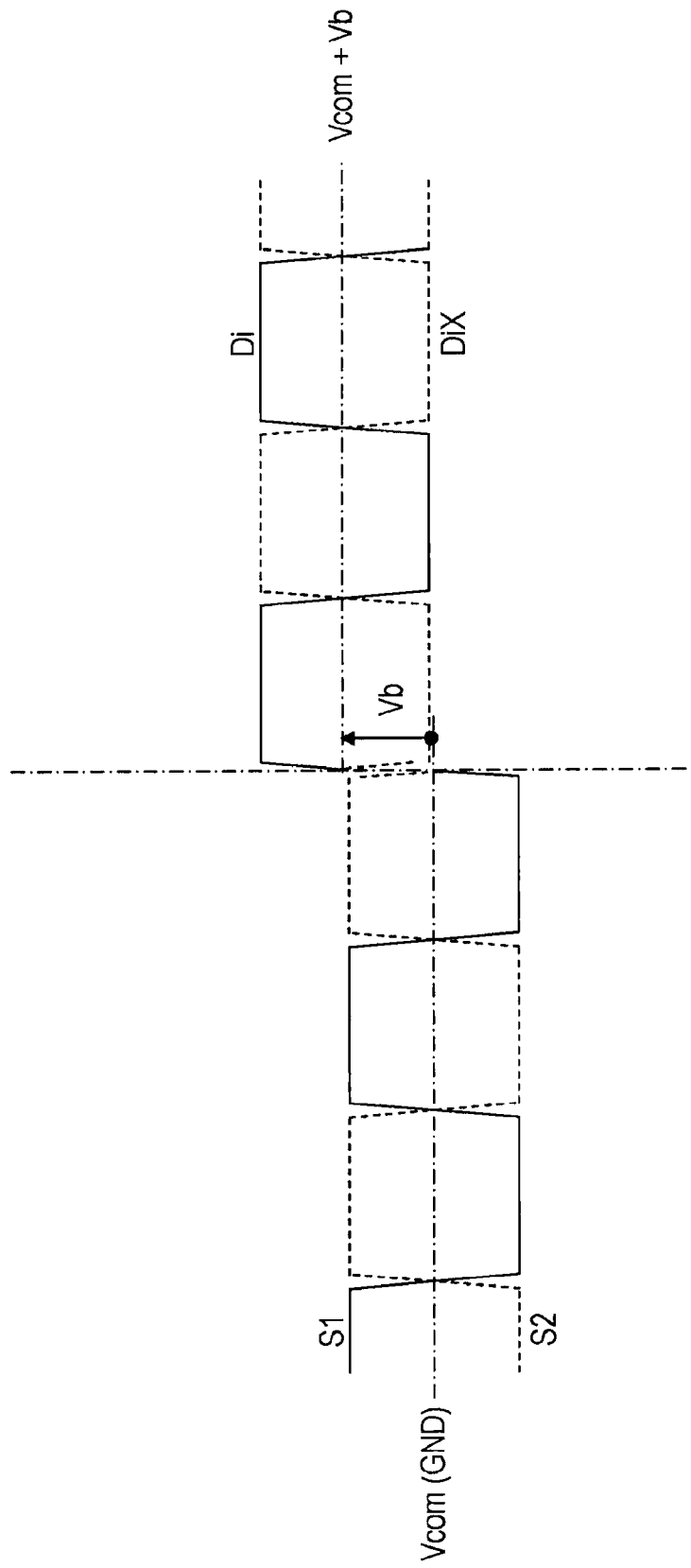
FIG. 5 illustrates an exemplary differential signals.

FIG. 5 illustrates an exemplary of differential signals. The differential signals illustrated in FIG. 5 may be differential signals before or after passing through the bypass capacitors C1 and C2. The common potential Vcom of the differential signals S1 and S2 to be transmitted to the signal lines Data and DataX is standardized to ground GND in PCI Express and is standardized to ground GND or a given voltage in Serial ATA. For simplification of description, the common potential Vcom of the differential signals S1 and S2 is assumed to be ground GND.

Differential signals Di and DiX illustrated in FIG. 5 are differential signals at the pair of inputs n31 and n32 after passing through the bypass capacitors C1 and C2. The differential signals Di and DiX have a common potential Vcom increased from the common potential Vcom of the input differential signals S1 and S2 by an amount corresponding to the bypass voltage Vb. The differential signals Di and DiX are input to the sampling circuit 21.

Figure 6:
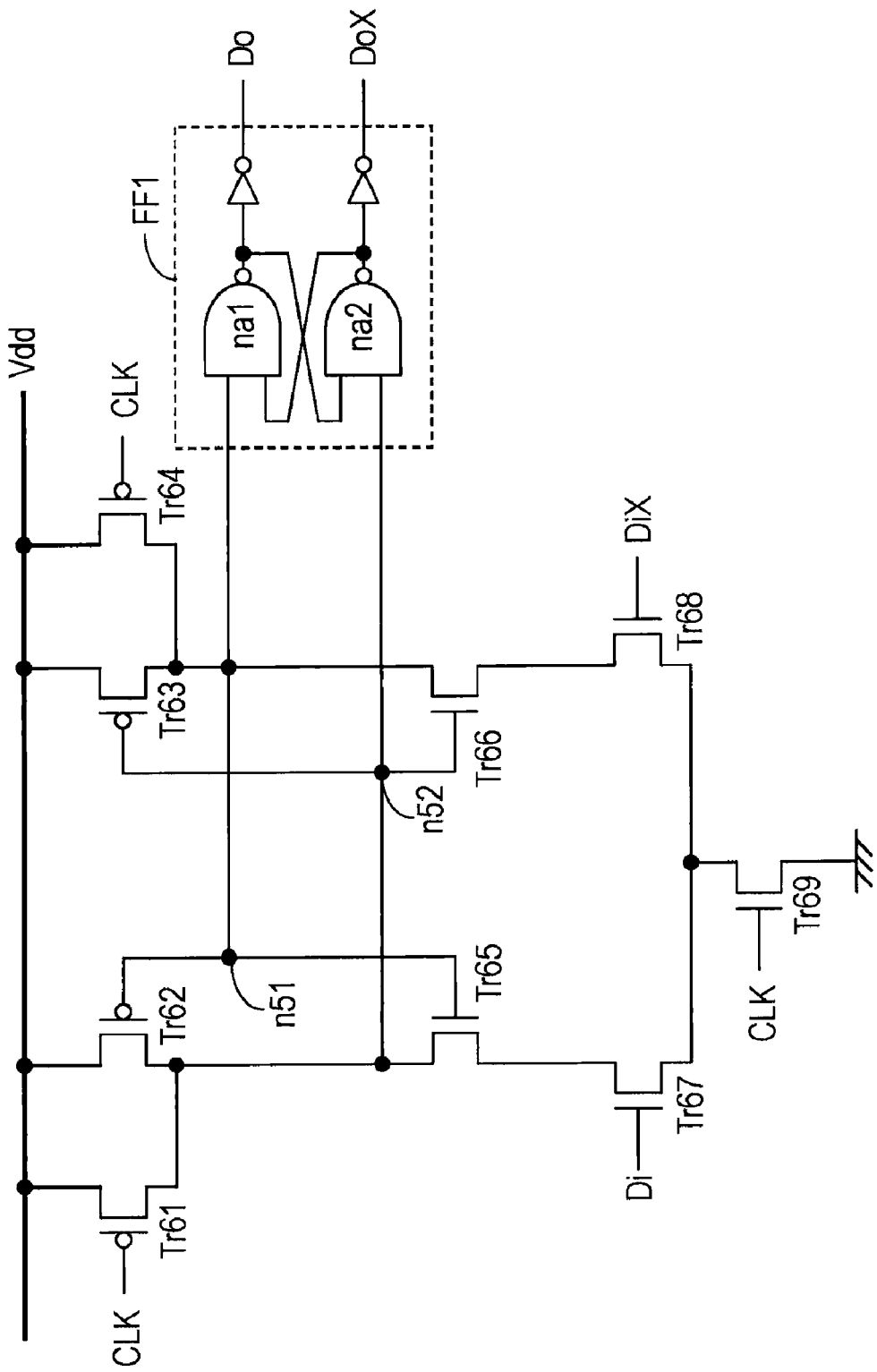
FIG. 6 illustrates an exemplary sampling circuit.

FIG. 6 illustrates an exemplary of a sampling circuit. The sampling circuit illustrated in FIG. 6 may be the sampling circuit 21 illustrated in FIG. 4. The sampling circuit 21 includes p-channel transistors Tr61 to Tr64, n-channel transistors Tr65 to Tr69, and a flip-flop FF1. For example, the differential signals Di and DiX illustrated in FIG. 5 are input to base terminals of the transistors Tr67 and Tr68. A clock signal CLK for sampling is input to base terminals of the transistors Tr61, Tr64, and Tr69. The transistors Tr62 and Tr65 and the transistors Tr63 and Tr66 include inverter circuits having latch circuits.

Figure 7:
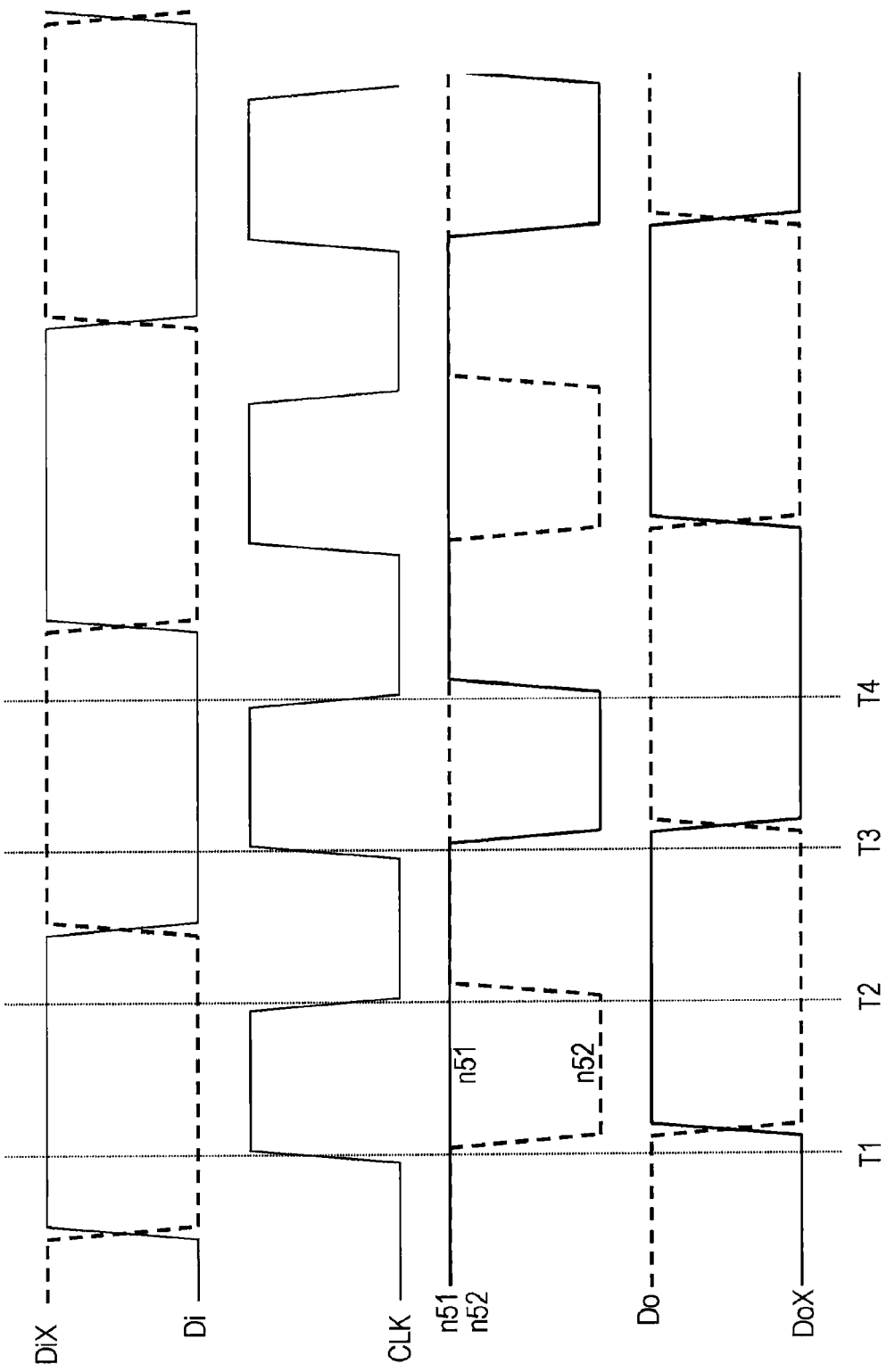
FIG. 7 illustrates an exemplary timing chart of a sampling circuit.

FIG. 7 illustrates an exemplary timing chart of a sampling circuit. The timing chart illustrated in FIG. 7 may be a timing chart of the sampling circuit 21 illustrated in FIG. 6. FIG. 7 illustrates the differential signals Di and DiX input to the sampling circuit 21, the clock CLK, the levels of nodes n51 and n52, and the levels of output signals Do and DoX.

In a reset state before time T1, the clock signal CLK is at a low level, the transistors Tr61 and Tr64 are turned on, the transistor Tr69 is turned off, and the nodes n51 and n52 are reset to a high level. The input signal Di is at a high level and the input signal DiX is at a low level.

In the sampling state at time T1, in response to the rising of the clock CLK to a high level, the transistor Tr69 is turned on and the transistors Tr61 and Tr64 are turned off. Since the input signal Di is at a high level and the input signal DiX is at a low level, the transistor Tr67 of the pair of the differential transistors is turned on and the transistor Tr68 thereof is turned off. Thus, the level of the node n52 is reduced, the transistor Tr66 is turned off, and the transistor Tr63 is turned on. The node n51 is maintained at a high level, the transistor Tr62 is turned off, and the level of the node n52 is further reduced. The transistors Tr62, Tr65, Tr63, and Tr66 may perform a latch operation.

The high level of the node n51 and the low level of the node n52 are latched by NAND gates na1 and na2 in the flip-flop FF1, and latched output signals Do and DoX are output to the internal circuit 22.

At time T2, in response to falling of the clock CLK to a low level, the transistor Tr69 is turned off and the transistors Tr61 and Tr64 are turned on, so that the sampling circuit 21 enters a reset state. Although the nodes n51 and n52 become a high level, the flip-flop FF1 maintains the previous states of the output signals Do and DoX. During the reset state, the differential states of the input signals S1 and S2 are reversed.

In a sampling state at time T3, in response to the rising edge of the clock CLK, the sampling circuit 21 latches the input signals S1 and S2 by performing an operation opposite to that at time T1. Thereafter, the sampling circuit 21 repeats the resetting and the sampling.

Referring back to FIG. 4, the differential-signal detector 5 includes a pair of n-channel transistors Tr1 and Tr2, a gate-bias generating circuit 6, and a comparator cmp. Source terminals of the n-channel transistors Tr1 and Tr2 are coupled to the input terminals n1 and n2 and drain terminals of the n-channel transistors Tr1 and Tr2 are coupled to a power source Vdd via a common resistor R3.

The gate-bias generating circuit 6 includes a pair of transistors Tr5 and Tr6 and two resistors R4 and R5. Source terminals of the transistors Tr5 and Tr6 are coupled to the input terminals n1 and n2, respectively, for a diode-connection. Resistance values of the resistors R4 and R5 are substantially equal to each other. The power sources Vdd are coupled to nodes n7 and n8 via current sources.

The gate-bias generating circuit 6 generates a bias voltage, for example a voltage for a node n9, which is higher than the common voltage Vcom of the input signals S1 and S2 by an amount corresponding to a threshold voltage of the transistors. The bias voltage is applied to gates of the transistors Tr1 and Tr2. Currents Itr1 and Itr2 in the transistors Tr1 and Tr2 change in accordance with voltages of the signals Di and DiX input to the input terminals n1 and n2 and the potential of a node n10 changes in accordance with the current values. The comparator cmp compares the potential of the node n10 with a reference voltage Vref.

When no differential signals are supplied to the input terminals n1 and n2 and the input signals S1 and S2 have the common voltage Vcom, for example, the ground potential, the gate-source voltages Vtr1_gs and Vtr2_gs of the transistors Tr1 and Tr2 are substantially equal to the threshold voltage. Thus, a small amount of current flows, so that the potential of the node n10 becomes higher than the reference voltage Vref and the detection signal Sig11 reaches a high level.

In the case of the single-ended mode, even when the common voltage Vcom of the input signals S1 and S2 fluctuates, the currents flowing in the transistors Tr1 and Tr2 become substantially constant since the gate-bias generating circuit 6 generates a bias voltage Vcom+Vth corresponding to the fluctuation. In the single-ended mode, since the currents flowing from the differential-signal detector 5 to the signal lines Data and DataX become substantially constant, the differential-signal detector 5 does not cause fluctuations in the input impedance.

Next, a description will be given of an operation when the opposite-phase differential signals S1 and S2 having their center potential at the common potential Vcom (illustrated in FIG. 5), the common potential being, for example, the potential of the ground GND, are supplied to the input terminals n1 and n2, a negative signal S1 having an amplitude Vm is input to the input terminal n1, and a positive signal S2 having an amplitude Vm is input to the input terminal n2.

Upon supply of the differential signals S1 and S2, a potential Vdata of the signal S1 of the input terminal n1 may become Vcom−Vm and the potential of the node n7 may become Vcom−Vm+Vth. Vth may be a threshold voltage of the transistor Try. The potential VdataX of the signal S2 of the input terminal n2 may become Vcom+Vm and the potential of the node n8 may become Vcom+Vm+Vth. Since the resistance values of the resistors R4 and R5 are substantially equal to each other, the level of the node n9 may become Vcom+Vth, which is substantially the center level of the node n7 and the node n8. A substantially constant bias voltage Vcom+Vth, obtained by increasing the common potential Vcom of the differential signals S1 and S2 by an amount corresponding to the threshold Vth, is supplied to the gate terminals of the transistors Tr1 and Tr2, regardless of the amplitudes Vm of the differential signals S1 and S2.

Since the source terminal of the transistor Tr1 is coupled to the input terminal n1 and the level thereof is Vcom−Vm, the gate-source voltage Vtr1_gs may become Vth+Vm. Since the source terminal of the transistor Tr2 is coupled to the input terminal n2 and the level thereof is Vcom+Vm, the gate-source voltage Vtr2_gs may become Vth−Vm (<Vth). Consequently, the current Itr2 does not flow to the transistor Tr2, but the current Itr1 flows to the transistor Tr1 and flows to the input terminal n1. The current Itr1 in the transistor Tr1 is larger than a current Itr1+Itr2 in the single-ended mode. Thus, the voltage of the node n10 becomes lower than the reference voltage Vref and the detection signal Sig11 of the comparator cmp reaches a low level.

The current Itr1 corresponding to the amplitude of the differential signal flows to the transistor Tr1. Thus, when the amplitudes of the differential signals S1 and S2 are large, the potential of the signal S1 becomes lower (for example, the potential of the signal S1 may become a larger negative potential), and the current Itr1 in the transistor Tr1 becomes larger. When the amplitudes of the differential signals S1 and S2 are small, the potential of the signal S1 does not become low (for example, the potential of the signal S1 may become a smaller negative potential), and the current Itr1 in the transistor Tr1 becomes smaller. In the differential mode where the differential signals S1 and S2 are supplied to the input terminals n1 and n2, currents flowing to the input terminals n1 and n2 vary and the input impedances vary in accordance with the amplitudes of the differential signals S1 and S2. Thus, the impedance values in the differential standard fluctuate.

Figure 8:
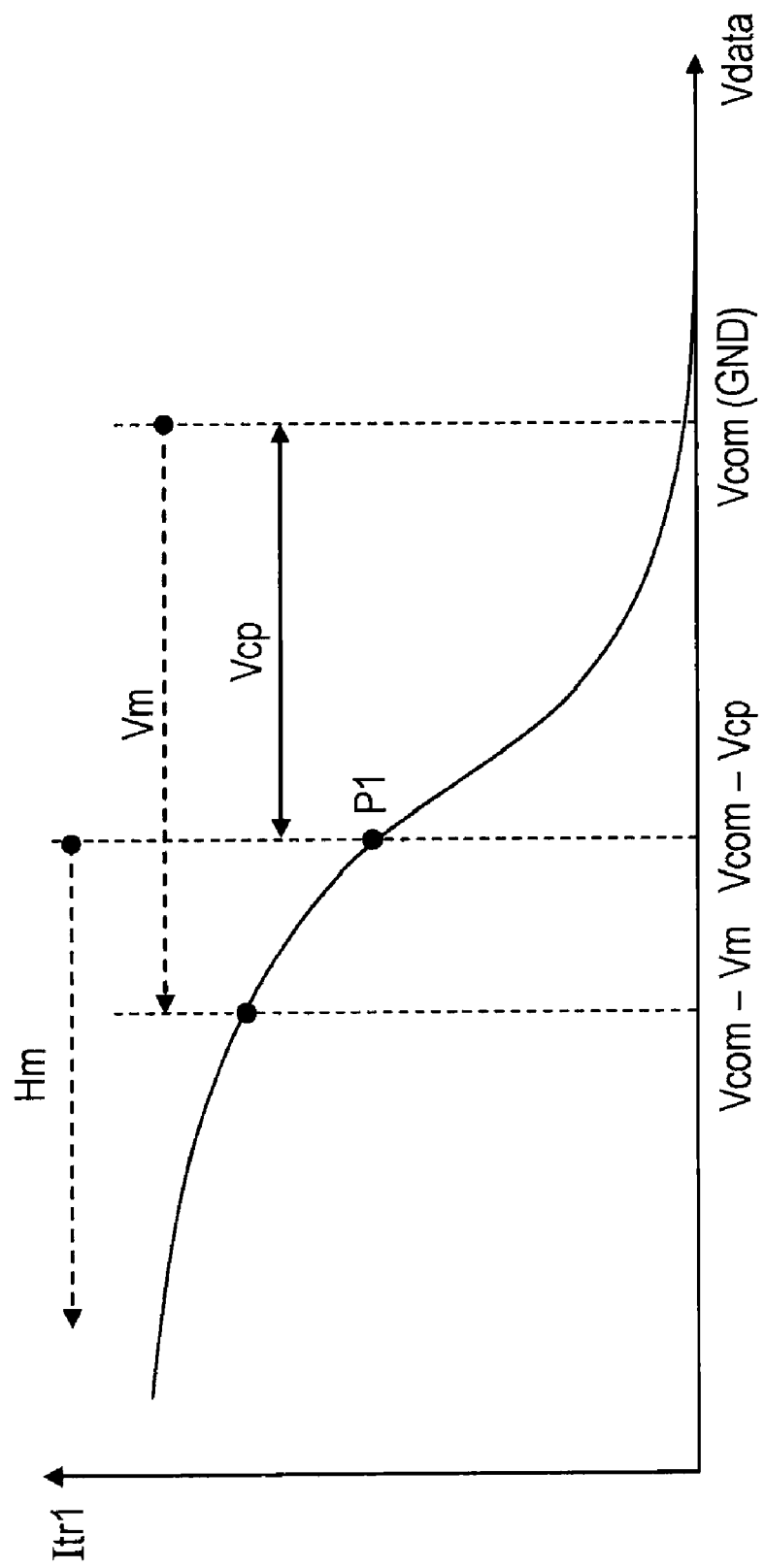
FIG. 8 illustrates an exemplary relationship between a potential of a differential signal and a current flowing to a transistor.

FIG. 8 illustrates an exemplary relationship between a potential of a differential signal and a current flowing to a transistor. The differential signal illustrated in FIG. 8 may be, for example, the differential signal S1 supplied to the input terminal n1 illustrated in FIG. 4 and the current illustrated in FIG. 8 may be the current Itr1 flowing to the transistor Tr1 illustrated in FIG. 4. An arrow Vm in FIG. 8 represents the amplitude Vm from the common potential Vcom of the differential signal S1. When a negative signal with the amplitude Vm having its center potential at the common potential Vcom is supplied to the input terminal n1, for example, the current Itr1 flowing to the transistor Tr1 increases in accordance with an increase in the amplitude Vm, as illustrated in FIG. 8, for example, in accordance with an increase in the negative potential with the amplitude Vm.

Figure 9:
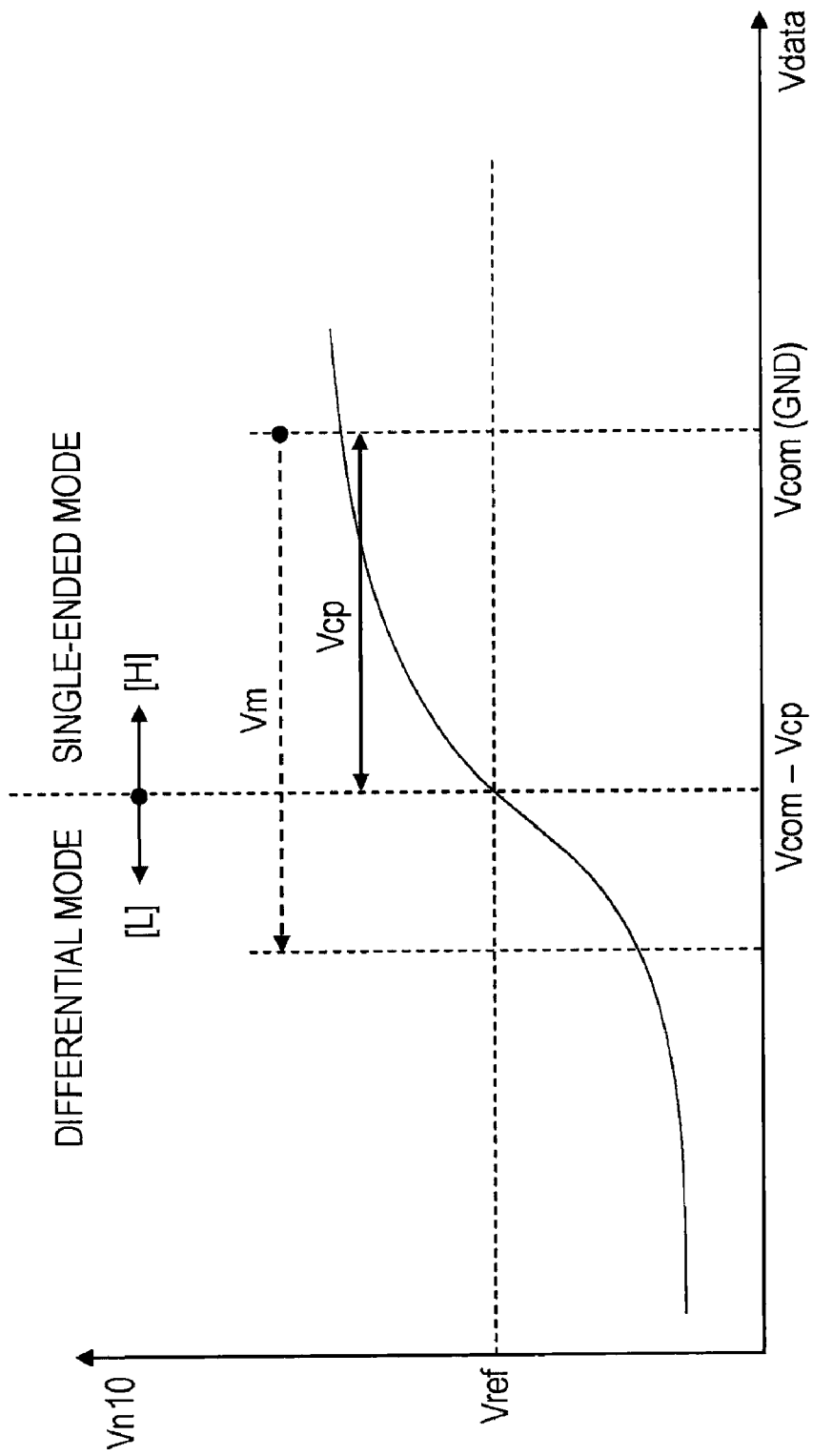
FIG. 9 illustrates an exemplary relationship between a potential of a differential signal and the potential of a node.

FIG. 9 illustrates an exemplary relationship between the potential of a differential signal and the potential of a node. The differential signal illustrated in FIG. 9 may be the differential signal S1 supplied to the input terminal n1 illustrated in FIG. 4 and the potential illustrated in FIG. 9 may be a potential Vn10 of the node n10 illustrated in FIG. 4. FIG. 9 is associated with FIG. 8, and the current Itr1 flows from the power source Vdd to the transistor Tr1 via the resistor R3 in accordance with the potential Vdata of the differential signal S1. Thus, a voltage drop that is proportional to the amount of current Itr1 occurs at the resistor R3, so that the level Vn10 of the node n10 decreases. An arrow Vm in FIG. 9 indicates the amplitude Vm from the common potential Vcom of the differential signal S1.

The comparator cmp monitors the level of the node n10. When the level Vn10 of the node n10 is higher than the reference level Vref, the detection signal Sig11 is at a high level, and when the level Vn10 of the node n10 is smaller than the reference level Vref, the detection signal Sig11 is at a low level. In the single-ended mode where no differential signals are supplied to the input terminals n1 and n2, the detection signal Sig11 is at a high level, and in the differential mode where the differential signals are supplied to the input terminals n1 and n2, the detection signal Sig11 is at a low level. Upon recognizing the presence/absence of the differential signals based on the detection signal Sig11, the internal circuit 22 enters the sleep mode or returns to the normal mode.

A potential Vcom−Vcp illustrated in FIG. 9 may be the potential Vdata of the differential signal S1 when the potential Vn10 of the node n10 matches the reference level Vref. When the amplitude Vm of the differential signal S1 is smaller than Vcp, the comparator cmp sets the detection signal Sig11 to a high level, and when the amplitude Vm of the differential signal S1 is greater than or equal to Vcp, the comparator cmp sets the detection signal Sig11 to a low level.

Hm represents an operating range in the differential mode. For example, when the impedance value of the differential standard is measured in the vicinity of P1 in the operating range Hm, fluctuations in the impedance value when the differential signals S1 and S2 having different amplitudes are supplied becomes large, since a change in the current Itr1 relative to a change in the amplitude Vm of the differential signal S1 is large. Thus, an impedance compensating circuit 7 reduces the change in the current Itr1 relative to the change in the amplitude Vm of the differential signal S1.

In the above-described embodiment, a negative signal having the amplitude Vm is supplied to the input terminal n1. When a positive signal having the amplitude Vm is supplied to the input terminal n1, the operations of the transistors Tr1 and Tr2 are reversed.

The impedance compensating circuit 7 illustrated in FIG. 4 includes a pair of p-channel transistors Tr3 and Tr4 and a pair of n-channel transistors Tr7 and Tr8. Turn-on and turn-off of the n-channel transistors Tr7 and Tr8 are controlled by a power-down signal PDX. Source terminals of the transistors Tr3 and Tr4 are coupled to the power source Vdd via a current source. A drain terminal of the transistor Tr3 is coupled to the input terminal n1 via the transistor Tr7 and a gate terminal of the transistor Tr3 is coupled to the input terminal n2. A drain terminal of the transistor Tr4 is coupled to the input terminal n2 via the transistor Tr8 and a gate terminal of the transistor Tr4 is coupled to the input terminal n1. The opposite-phase signals S2 and S1 at the input terminals n2 and n1 are supplied to the gates of the transistors Tr3 and Tr4 in the impedance compensating circuit 7. In the normal operation where the power-down signal PDX is at a high level, the transistors Tr7 and Tr8 are turned on, and in the sleep state where the power-down signal PDX is at a low level, the transistors Tr7 and Tr8 are turned off.

The negative signal S1 having the amplitude Vm is input to the input terminal n1 and the positive signal S2 having the amplitude Vm is input to the input terminal n2.

FIG. 10 illustrates an exemplary operation of an impedance compensating circuit. The impedance compensating circuit operation illustrated in FIG. 10 may be performed by the impedance compensating circuit 7 illustrated in FIG. 4. Referring to FIG. 10, differential signals S1 and S2 having a large differential voltage Vdiff1 (an amplitude Vm1) and having their center potential at the common potential Vcom (GND) and differential signals S1 and S2 having a differential voltage Vdiff1 (an amplitude Vm2), which is smaller than the differential voltage Vdiff1, are input to the input terminals n1 and n2, respectively. A potential VR may have the level at a node n15 in the impedance compensating circuit 7. The potential of the differential signal S1 or S2 may be Vdata or VdataX. Vcom+Vth may be a gate-bias voltage of the differential-signal detector 5.

When the differential signals S1 and S2 having the large differential voltage Vdiff1 are supplied to the input terminals n1 and n2, the potential Vdata of the differential signal S1 at the input terminal n1 becomes a larger negative potential. Since the bias voltage supplied to the gate terminal of the transistor Tr1 is Vcom+Vth, the gate-source voltage Vtr1_gs of the transistor Tr1 is expressed by a potential difference Vtr1_gs1 (=Vth+Vm1). The potential VdataX of the differential signal S2 at the input terminal n2 has a higher positive level. Thus, a gate-source voltage Vtr3_gs of the transistor Tr3 is expressed by a potential difference Vtr3_gs1 (=VR−Vm1). Currents Itr1_1 and Itr3_1 corresponding to the gate-source voltages Vtr1_gs1 and Vtr3_gs1 flow through the transistors Tr1 and Tr3, respectively. The current Itr1_1 in the transistor Tr1 is large and the current Itr3_1 in the transistor Tr3 is small.

When differential signals S1 and S2 having the smaller differential voltage Vdiff2 than the differential voltage Vdiff1 are supplied to the input terminals n1 and n2, the potential Vdata of the differential signal S1 at the input terminal n1 becomes a smaller negative potential and the potential VdataX of the differential signal S2 at the input terminal n2 becomes a low positive potential. Thus, the gate-source voltage Vtn1_gs of the transistor Tr1 is expressed by a potential difference Vtr1_gs2 (=Vth+Vm2). The gate-source voltage Vtr3_gs of the transistor Tr3 is expressed by a potential difference Vtr3_gs2 (=VR−Vm2). Currents Itr1_2 and Itr3_2 corresponding to the gate-source voltages Vtr1_gs2 and Vtr3_gs2 flow through the transistors Tr1 and Tr3, respectively. The current Itr1_2 (<Itr1_1) in the transistor Tr1 is small and the current Itr3_2 (<Itr3_1) in the transistor Tr3 is large.

When the amplitude Vm1 of the differential signals S1 and S2 changes to an amplitude Vm2 that is smaller than the amplitude Vm1, the current Itr1_1 flowing from the differential-signal detector 5 to the input terminal n1 may change to a current Itr1_2 that is smaller than the current Itr1_1. The current Itr3_1 flowing from the impedance compensating circuit 7 to the input terminal n1 changes to the current Itr3_2 that is larger than the current Itr3_1.

A sum Itr1_1+Itr3_1 of the currents flowing from the transistors Tr1 and Tr3 to the input terminal n1 in the case of the amplitude Vm1 and a sum Itr1_2+Itr3_2 of the currents flowing from the transistors Tr1 and Tr3 to the input terminal n1 in the case of the amplitude Vm2 may be substantially equal to each other. The transistor Tr4 in the impedance compensating circuit 7 is in a saturated state, so that a current Itr4 becomes substantially the same in either of the amplitudes Vm1 and Vm2. In the differential mode, the current flowing to the input terminal n1 may be substantially constant, without being dependent on the amplitudes of the differential signals S1 and S2.

FIG. 11 illustrates an exemplary relationship between a differential signal and a current flowing to the input terminal. The relationship illustrated in FIG. 11 may be a relationship between the level Vdata of the differential signal S1 supplied to the input terminal n1 illustrated in FIG. 4 and a sum of the currents flowing to the input terminals n1 or n2 illustrated in FIG. 4. In FIG. 11, currents Itr1 to Itr4 flow to the corresponding transistors Tr1 to Tr4 with respect to the potential Vdata of the differential signal S1, and the sum of the currents becomes a total current Itotal. The operating range Hm may be substantially the same as or similar to the differential-mode operating range illustrated in FIG. 8.

In FIG. 11, a left side of the common potential Vcom (GND) illustrates a change in the total current Itotal of the currents Itr1 to Itr4 when the potential Vdata of the differential signal S1 is negative. A right side of the common potential Vcom (GND) illustrates a change in the total current Itotal of the currents Itr1 to Itr4 when the potential Vdata of the differential signal S1 is positive.

The amplitudes Vm1 and Vm2 and the current Itr1_1 and Itr3_1, Itr1_2, and Itr3_2, which are illustrated in FIG. 11, flowing to the transistors Tr1 and Tr3 may correspond to those illustrated in FIG. 10. When the amplitude Vm1 of the differential signal S1 changes to Vm2, the current Itr1 in the transistor Tr1 decreases from Itr1_1 to Itr1_2, and the current Itr3 in the transistor Tr3 increases from Itr3_1 to Itr3_2, so that changes in the amounts of currents Itr1 and Itr3 cancel each other out.

When the amplitude changes, the transistor Tr2 in the differential-signal detector 5 is turned off since the differential signal S2 has a positive potential. Consequently, the currents Itr2_1 and Itr2_2 become zeros, and saturated currents Itr4_1 and Itr4_2 that are substantially equal to each other flow through the transistor Tr4. As illustrated in FIG. 4, a negative signal, which corresponds to the potential Vdata of the differential signal S1, is supplied to the gate terminal of the transistor Tr4. Thus, the transistor Tr4 operates in a saturation region in response to a negative gate input and the current Itr4 may not change. Even when the amplitude Vm1 of the differential signal S1 changes to Vm2, the currents flowing from the transistors Tr2 and Tr4 to the input terminal n2 do not change.

When the amplitude Vm1 of the differential signal S1 changes to Vm2, the saturation currents Itotal 1 and Itotal_2 of the currents Itr1 to Itr4 flow from the differential-signal detector 5 and the impedance compensating circuit 7 to the input terminal n1. Since the currents Itotal_1 and Itotal_2 are substantially equal to each other, fluctuations in the impedance value in the differential standard are reduced.

A negative signal having the amplitude Vm is supplied to the input terminal n1. When a positive signal having the amplitude Vm is supplied to the input terminal n1, the operations of the transistors Tr1 and Tr2 and the operations of the transistors Tr1 and Tr4 are switched and thus the current flows to the input terminal n2.

The currents that the differential-signal detector 5 causes to flow to the input terminals n1 and n2 change in response to changes in the amplitudes of the differential signals S1 and S2. The impedance compensating circuit 7 causes currents for canceling the changes to flow to the input terminals n1 and n2. Thus, electrical-current changes corresponding to the amplitudes of the differential signals S1 and S2 flowing to the input terminal n1 may be reduced, and fluctuations in the impedance values in the differential standard may be reduced. Reflection caused by the amplitude levels of the differential signals S1 and S2 may be reduced.

Example embodiments of the present invention have now been described in accordance with the above advantages. It will be appreciated that these examples are merely illustrative of the invention. Many variations and modifications will be apparent to those skilled in the art.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. A receiving circuit, comprising:
an impedance compensating circuit, including: a first input terminal and a second input terminal coupled to a first signal line and a second signal line, respectively, a first signal and a second signal being transmitted at the first input terminal and the second input terminal respectively, the first and second signals being differential signals;
a signal input circuit, coupled to the first input terminal and the second input terminal, configured to receive the first signal and the second signal; and
a differential-signal detector configured to detect whether or not the first and second signals are supplied to the first input terminal and the second input terminal;
wherein the impedance compensating circuit is coupled to the differential-signal detector in parallel at the first input terminal and the second input terminal,
wherein the differential-signal detector is configured to cause a first current to flow to the first input terminal when a potential of the second signal is higher than a potential of the first signal, and when the first signal and the second signal have a first potential difference,
wherein the differential-signal detector is configured to cause a second current to flow to the first input terminal when the potential of the second signal is higher than the potential of the first signal, and when the first signal and the second signal have a second potential difference,
wherein the impedance compensating circuit is configured to cause a third current to flow to the first input terminal when the potential of the second potential is higher than the potential of the first signal, and when the first signal and the second signal have the first potential difference, and
wherein the impedance compensating circuit is configured to cause a fourth current to flow to the first input terminal when the potential of the second potential is higher than the potential of the first signal, and when the first signal and the second signal have the second potential difference.

2. The receiving circuit according to claim 1, wherein the fourth current is greater than the third current.

3. The receiving circuit according to claim 1, wherein the first signal line and the second signal line are terminated respectively.

4. The receiving circuit according to claim 1, wherein the second current is less than the first current.

5. The receiving circuit according to claim 1, wherein the differential-signal detector includes:
a pair of first-conductivity-type MOS transistors, source terminals of the pair of first-conductivity-type MOS transistors being coupled to the first input terminal and the second input terminal, respectively, gate terminals of the pair of first-conductivity-type MOS transistors being coupled to a bias voltage obtained by increasing a common potential of the first signal and the second signal, drain terminals of the pair of first-conductivity-type MOS transistors being coupled to a power supply via a common resistor, and
a comparator configured to detect supply of the first and second signals based on potentials of the drain terminals,
wherein the impedance compensating circuit further includes a pair of second-conductivity-type MOS transistors, drain terminals of the pair of second-conductivity-type MOS transistors coupled to the first input terminal and the second input terminal, respectively, gate terminals of the pair of second-conductivity-type MOS transistors being coupled to the second input terminal and the first input terminal, respectively, and source terminals of the pair of second-conductivity-type MOS transistors being coupled to a current source.

6. The receiving circuit according to claim 5, wherein the second potential difference is less than the first potential difference.

7. The receiving circuit according to claim 6, wherein the second current is less than the first current.

8. The receiving circuit according to claim 7, wherein the fourth current is greater than the third current.

9. The receiving circuit according to claim 8, wherein the first signal line and the second signal line are terminated respectively.

10. The receiving circuit according to claim 1, wherein the second potential difference is less than the first potential difference.

11. The receiving circuit according to claim 10, wherein the second current is less than the first current.

12. The receiving circuit according to claim 11, wherein the fourth current is greater than the third current.

13. The receiving circuit according to claim 12, wherein the first signal line and the second signal line are terminated respectively.

14. A receiving circuit, comprising:
an impedance compensating circuit, including: a first input terminal and a second input terminal coupled to a first signal line and a second signal line, respectively, a first signal and a second signal being transmitted at the first input terminal and the second input terminal respectively, the first and second signals being differential signals;
a signal input circuit, coupled to the first input terminal and the second input terminal, configured to receive the first signal and the second signal; and
a differential-signal detector configured to detect whether or not the first and second signals are supplied to the first input terminal and the second input terminal,
wherein the differential-signal detector is configured to cause a first current to flow to the first input terminal when a potential of the second signal is higher than a potential of the first signal, and when the first signal and the second signal have a first potential difference,
wherein the differential-signal detector is configured to cause a second current to flow to the first input terminal when the potential of the second signal is higher than the potential of the first signal, and when the first signal and the second signal have a second potential difference,
wherein the impedance compensating circuit is configured to cause a third current to flow to the first input terminal when the potential of the second potential is higher than the potential of the first signal, and when the first signal and the second signal have the first potential difference, and
wherein the impedance compensating circuit is configured to cause a fourth current to flow to the first input terminal when the potential of the second potential is higher than the potential of the first signal, and when the first signal and the second signal have the second potential difference,
wherein the differential-signal detector includes a pair of first-conductivity-type MOS transistors, source terminals of the pair of first-conductivity-type MOS transistors being coupled to the first input terminal and the second input terminal, respectively, and
wherein the impedance compensating circuit includes a pair of second-conductivity-type MOS transistors, drain terminals of the pair of second-conductivity-type MOS transistors coupled to the first input terminal and the second input terminal, respectively.

15. The receiving circuit according to claim 14, wherein gate terminals of the pair of first-conductivity-type MOS transistors are coupled to a bias voltage, drain terminals of the pair of first-conductivity-type MOS transistors are coupled to a power supply via a common resistor, gate terminals of the pair of second-conductivity-type MOS transistors are coupled to the second input terminal and the first input terminal, respectively, and source terminals of the pair of second-conductivity-type MOS transistors are coupled to a current source.

16. The receiving circuit according to claim 14, wherein the differential-signal detector further includes a comparator configured to detect supply of the first and second signals based on potentials of the drain terminals the pair of first-conductivity-type MOS transistors.

* * * * *

UNITED STATES PATENT AND TRADEMARK OFFICE
CERTIFICATE OF CORRECTION

PATENT NO. : 8,253,444 B2
APPLICATION NO. : 12/696335
DATED : August 28, 2012
INVENTOR(S) : Tetsuya Hayashi et al.

It is certified that error appears in the above-identified patent and that said Letters Patent is hereby corrected as shown below:

On the Title page please insert:

Item -- (30) March 23, 2009   (JP)...............2009-69805 --

Signed and Sealed this
Ninth Day of April, 2013

Teresa Stanek Rea
*Acting Director of the United States Patent and Trademark Office*